(12) United States Patent
Bachman et al.

(10) Patent No.: US 6,611,116 B2
(45) Date of Patent: Aug. 26, 2003

(54) ANTI-SPIN CONTROL FOR A SEPARATELY EXCITED MOTOR DRIVE SYSTEM

(75) Inventors: Michael Bachman, San Ramon, CA (US); Gevorg Nahapetian, Pleasanton, CA (US); Bill May, Livermore, CA (US)

(73) Assignee: Curtis Instruments, Inc., Livermore, CA (US)

( * ) Notice: Subject to any disclaimer, the term of this patent is extended or adjusted under 35 U.S.C. 154(b) by 0 days.

(21) Appl. No.: 09/853,404

(22) Filed: May 10, 2001

(65) Prior Publication Data
US 2002/0005304 A1 Jan. 17, 2002

Related U.S. Application Data
(60) Provisional application No. 60/203,423, filed on May 10, 2000.

(51) Int. Cl.$^7$ ................................................. H02P 5/17
(52) U.S. Cl. .................. 318/139; 318/34; 388/801; 388/803; 388/804
(58) Field of Search .................... 318/34, 51, 52, 318/63, 79, 88, 109, 111, 139; 388/801, 802, 803, 804

(56) References Cited

U.S. PATENT DOCUMENTS

| 3,764,867 A | * | 10/1973 | Smith | 318/82 |
| 5,264,763 A | * | 11/1993 | Avitan | 318/139 |
| 6,028,403 A | * | 2/2000 | Fukatsu | 318/88 |

* cited by examiner

Primary Examiner—Khanh Dang
(74) Attorney, Agent, or Firm—Beyer Weaver & Thomas LLP

(57) ABSTRACT

Methods and apparatus for controlling performance of electric motors in a system having two or more electric motors, the motors adapted for being coupled to two or more wheels of an electric vehicle, each of the electric motors having armature and field coils which are independently excited by a source of voltage to generate armature and field currents, the armatures being connected in series to the voltage source include detecting a condition in the system indicating that one of the wheels is slipping, reducing power delivered to one of the motors that is associated with the slipping wheel in response to the detection of the condition, providing power to the one or more motors that are not associated with the slipping wheel after the power delivered to the motor associated with the slipping wheel is reduced, and restoring the power delivered to the one of the motors associated with the slipping wheel in response to a recovery event.

49 Claims, 9 Drawing Sheets

Series connected field and armature

US 6,611,116 B2

ANTI-SPIN CONTROL FOR A SEPARATELY EXCITED MOTOR DRIVE SYSTEM

CROSS REFERENCE TO RELATED APPLICATIONS

This application claims priority of provisional U.S. patent application Ser. No. 60/203,423, filed May 10, 2000, entitled "Anti-Spin Control for a Separately Excited Motor Drive System" which is incorporated by reference.

BACKGROUND OF THE INVENTION

1. Field of the Invention

The present invention relates to vehicles in which two or more driven wheels are each connected to an individual separately excited DC motor yet driven by a single controller. More particularly, the present invention relates to methods and apparatus for detecting, eliminating and recovering from a condition in which a single wheel loses contact with the ground or spins on a low friction surface.

2. Description of the Related Art

Many electric vehicles have unique performance requirements that pose difficult obstacles to the design of control systems that are used to control the vehicles. For instance, aerial platforms (e.g., scissor lifts) and tuggers used to tow luggage within airports are typically difficult to maneuver due to the potentially large and uneven weight distribution, as well as the proportions of the vehicle. In order to increase the control with which these vehicles are operated and provide increased traction, separate motors are often used to independently drive wheels on the left and right sides of the vehicle.

In an electric motor vehicle controlled by two or more DC motors connected in series, there are many potentially undesirable environmental obstacles that can prevent normal operation of the vehicle. As one example, when the vehicle is driven into a pothole or over a ramp, one of the wheels may lose contact with the ground and spin, making it difficult if not impossible to steer the vehicle out of the pothole. As another example, driving over ice or other low friction surface may cause one of the wheels to spin uncontrollably. As the offending motor speeds up it produces increased back Electro-Motive Force (EMF). As the EMF increases, it robs the other motor of applied voltage. As a result, the motor current decreases and a total torque produced by both motors decreases. This often leads to a stalled vehicle or roll-back.

Drive systems of electric vehicles such as aerial platforms often employ dual motors with a single controller to save costs while providing increased traction. However, in those systems that do attempt to resolve the spinning wheel problem, the motors are connected in parallel or to separate controllers, increasing the system cost. Moreover, many such systems require that the operator detect the spinning wheel problem as well as manually initiate an anti-spin control mechanism to alleviate the spinning wheel problem. Accordingly, there are continuing efforts to provide improved control mechanisms that facilitate detecting, eliminating and recovering from a single wheel spin in a vehicle in which two or more driven wheels are each connected to an electric motor.

SUMMARY OF THE INVENTION

The present invention enables the performance of electric motors having armature and field coils that are independently excited by a source of voltage, in which the armature coils are connected in series, to be controlled by a single controller. Since each electric motor has armature and field coils that are independently excited by a single source of voltage, power around either the armature or field coils may be separately shunted. Using such a shunting mechanism, once a "single wheel spin" is detected, recovery from the single wheel spin may be performed.

In accordance with one aspect of the invention, methods and apparatus for controlling performance of electric motors in a system having two or more electric motors are disclosed. The motors are adapted for being coupled to two or more wheels of an electric vehicle, where each of the electric motors include armature and field coils which are independently excited by a source of voltage to generate armature and field currents. In addition, the armatures are connected in series to the voltage source. The methods and apparatus include detecting a condition in the system indicating that one of the wheels is slipping, reducing power delivered to one of the motors that is associated with the slipping wheel in response to the detection of the condition, providing power to the one or more motors that are not associated with the slipping wheel after the power delivered to the motor associated with the slipping wheel is reduced, and restoring the power delivered to the one of the motors associated with the slipping wheel in response to a recovery event.

In accordance with another aspect of the invention, a condition in the system is detected to ascertain when to deactivate one of the motors. One of the motors to deactivate is identified when the condition is detected. Current in the identified motor is then eliminated. The current may be armature current or field current. Armature current and field current are then provided to the one or more motors that are not identified as one of the motors to deactivate after the current is eliminated in the identified motor. The current in the identified motor is then restored in response to a recovery event.

A recovery event may be defined by a variety of different events. For example, a recovery event may include the detection of movement of the vehicle in a desired direction, movement of the vehicle for a specified period of time, and/or movement of the vehicle for a specified distance. Similarly, a recovery event may be a lapse of a predetermined period of time or a user-initiated event such as the return of a throttle in the vehicle to neutral or initiation of braking of the vehicle.

DETAILED DESCRIPTION OF THE INVENTION

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

The present invention provides anti-spin control for a motor drive system having two or more series connected shunt wound direct current electric motors having separately excited armature and field windings. That is, the armatures of the two or more motors are connected in series. As will be discussed in more detail below, the field windings from the different motors may be connected in series, in parallel or independently. As will be described with reference to the following figures, the present invention enables detection and recovery from a single wheel spin in a vehicle in which two or more driven wheels are each connected to a separate electric motor.

In the event that a single wheel loses contact with the ground or spins on a low friction surface, a sensed voltage swings beyond normal limits as the offending motor speeds up and produces increased back EMF. As the EMF increases, it robs the other motor of applied voltage, the motor current decreases and a total torque produced by both motors decreases. This often leads to a stalled vehicle or roll-back. Thus, in accordance with the present invention, a controller responds by shunting the current around the offending motor (e.g., with a small relay). The offending motor will quickly lose back EMF for lack of field flux. With the reduction of EMF from the now shunted motor, the increased voltage on the remaining motor will allow substantially increased armature current and thus increased torque. This in turn will allow the vehicle to continue to move or restrain roll-back. After movement is detected or some time has elapsed, the shunt relay is de-activated and power is restored to both field coils so that both motors can produce torque. This allows the vehicle to move past the obstacle, hole or other low friction event and return to normal dual motor drive.

Figure 1:
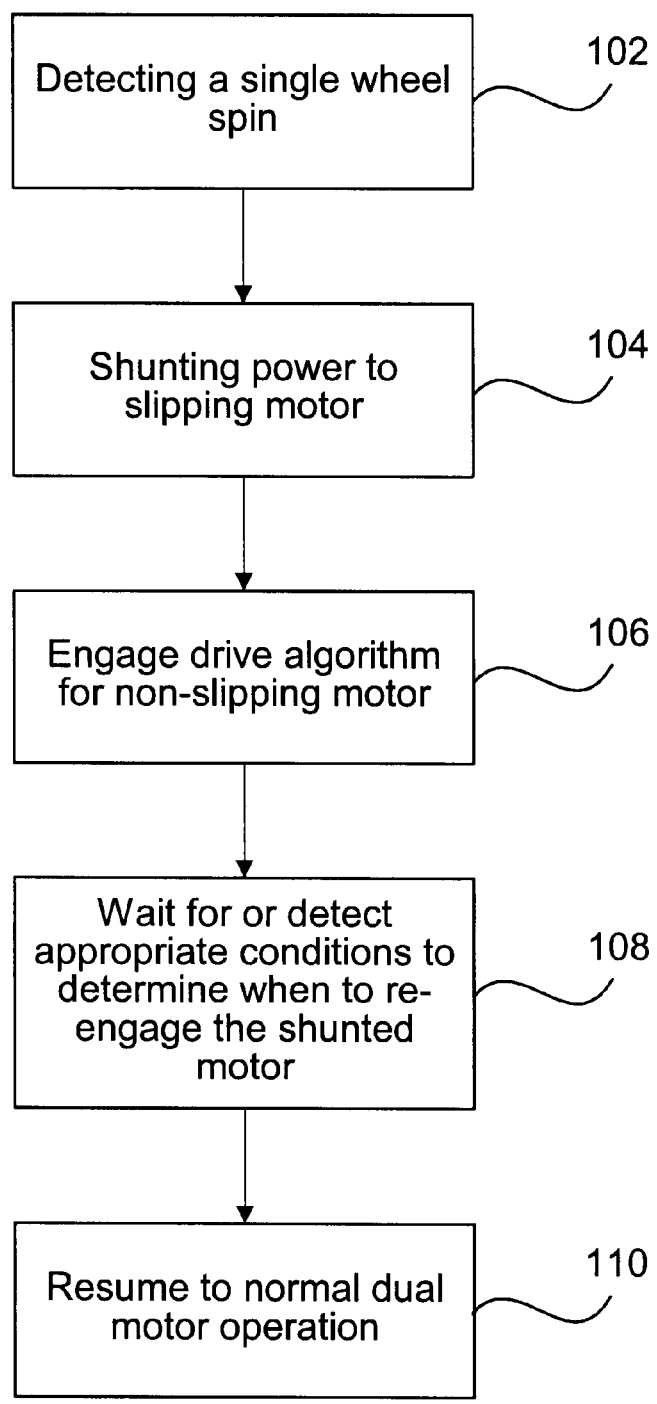
FIG. 1 is a process flow diagram illustrating a general method of implementing an anti-spin control system in accordance with one embodiment of the invention.

FIG. 1 is a process flow diagram illustrating a general method of implementing an anti-spin control system in accordance with one embodiment of the invention. First, a single wheel spin is detected at block 102 in order to determine when to deactivate one of the motors. When this condition is detected, the "slipping motor" may then be identified. Next, power (e.g., field power) is shunted around the slipping motor at block 104. More particularly, since the motors are independently excited, power may be shunted by eliminating either armature current or field current in the identified motor. In the following described embodiment, the field current is eliminated. After the current in the field of the offending motor is eliminated, a drive algorithm is engaged for the non-slipping motor(s) at block 106. In other words, both armature and field current are supplied to the remaining motors. Next, the system waits for or detects appropriate conditions to determine when to re-engage the shunted motor as shown at block 108. The vehicle may then resume to normal dual motor operation at block 110 in response to this recovery event. More particularly, the current that has been eliminated from the slipping motor is now restored.

Embodiments Used to Shunt and Restore Power to a Slipping Motor

Figure 2:
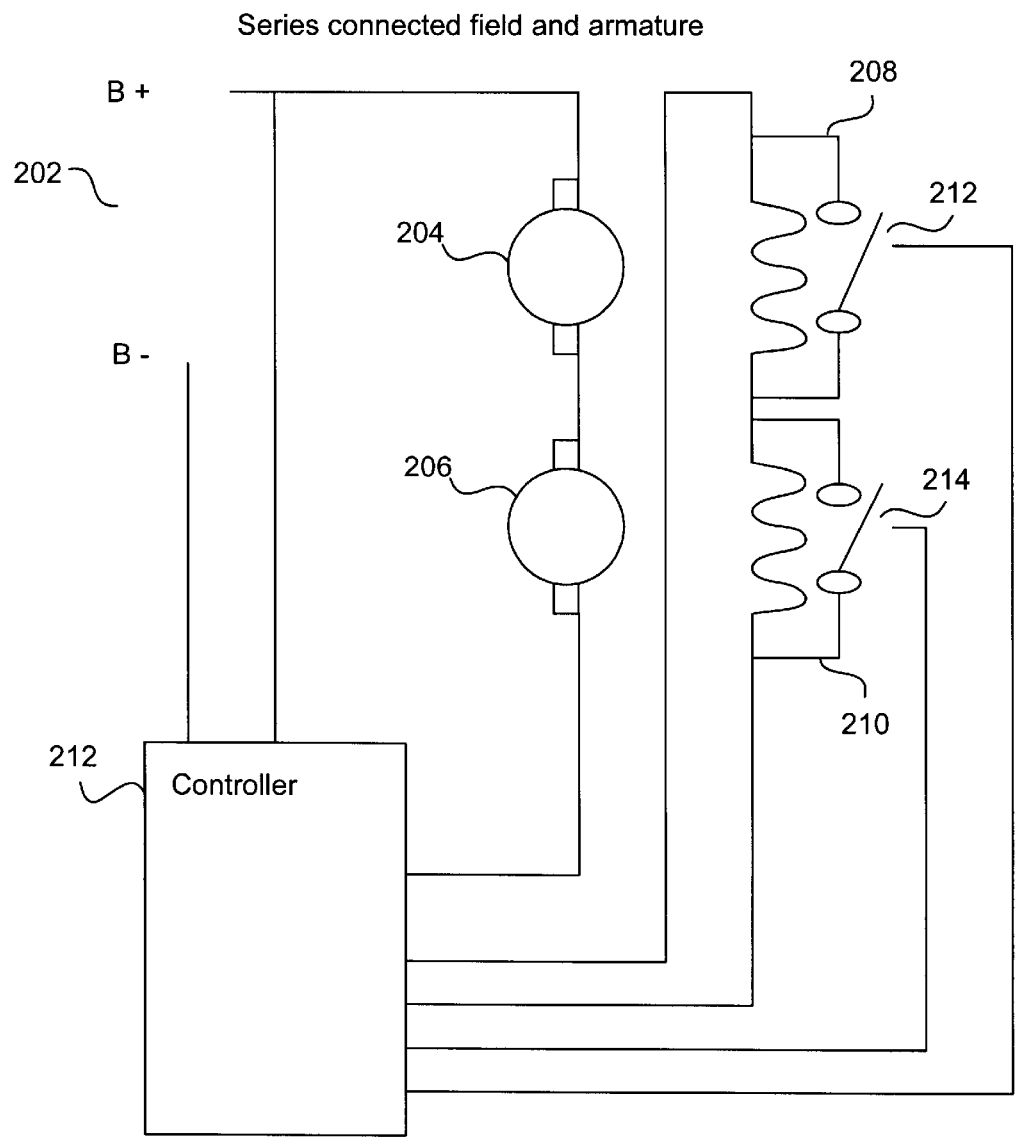
FIG. 2 is a block diagram illustrating a first dual motor system in which the present invention may be implemented, where the field windings are connected in series and the armatures are connected in series.
Figure 5:
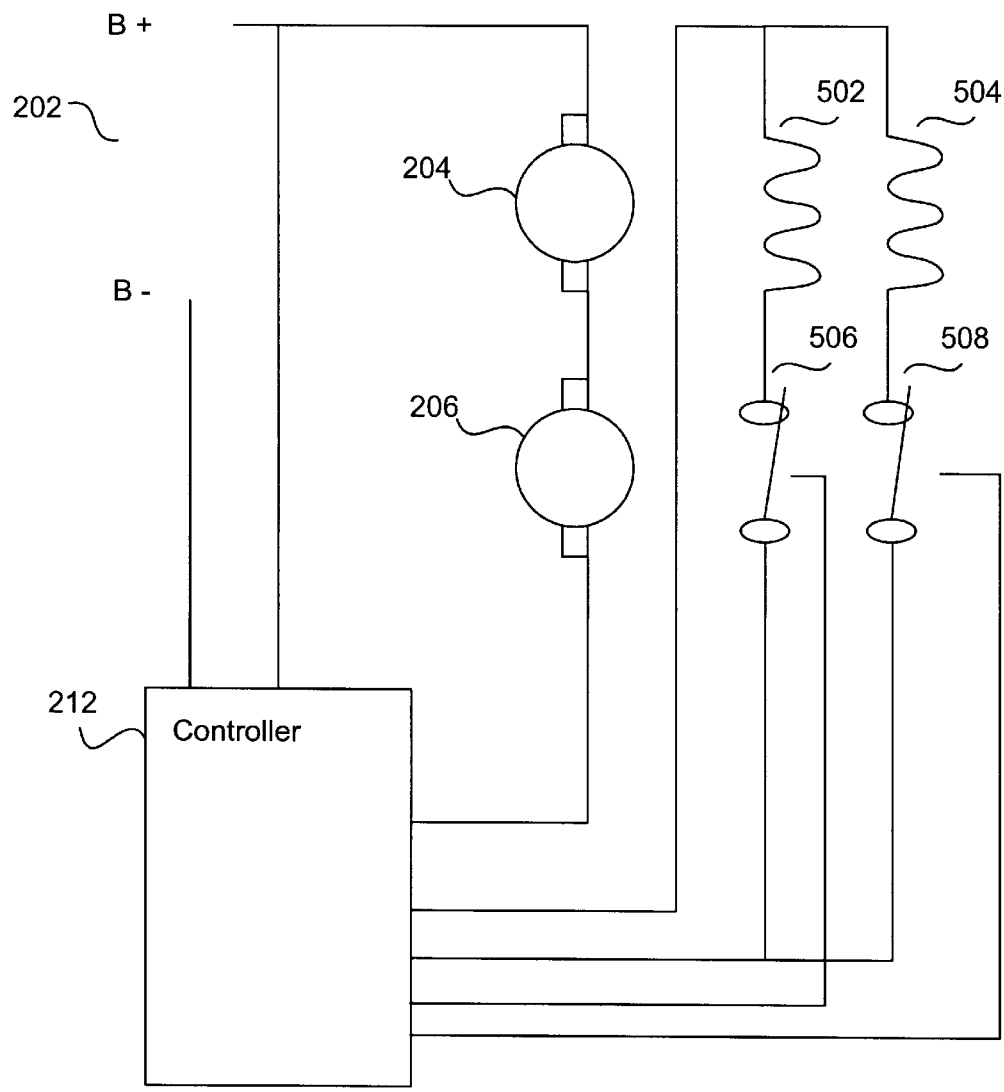
FIG. 5 is a block diagram illustrating a second dual motor system in which the present invention may be implemented, where the field windings are connected in parallel and the armatures are connected in series.
Figure 8:
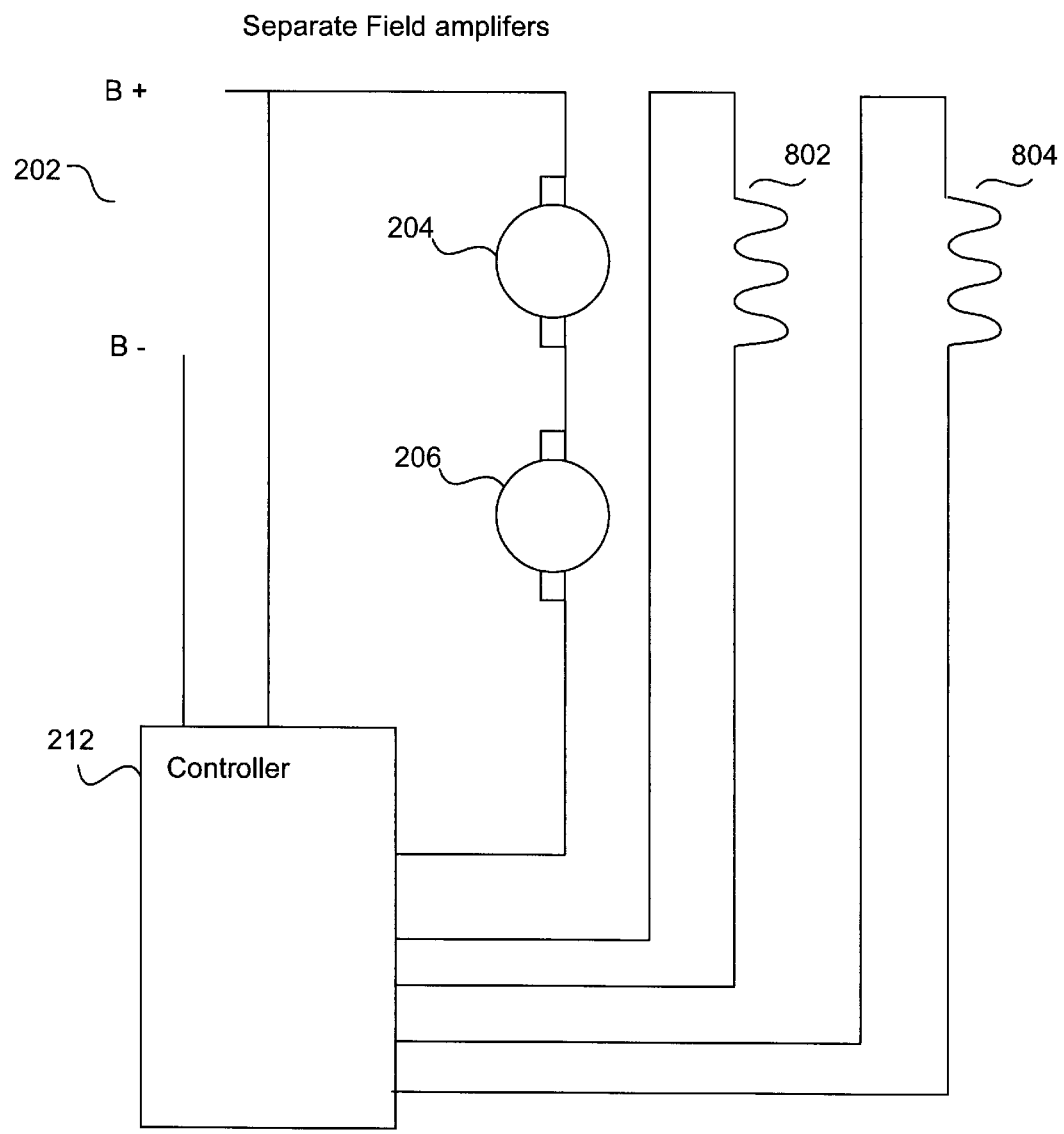
FIG. 8 is a block diagram illustrating a third dual motor system in which the present invention may be implemented, where the armatures are connected in series and a separate independent field drive amplifier is connected to each of the parallel connected field windings.

FIG. 2, FIG. 5, and FIG. 8 illustrate several possible embodiments of a dual motor drive system in which the anti-spin control may be implemented. In the following described embodiments, the back EMF of the spinning motor is reduced such that voltage and therefore torque can be restored to the remaining motors. More particularly, the anti-spin control may be implemented by adjusting the current across either the armature or the field winding of the "spinning" motor. However, in the embodiments described with reference to the following figures, elimination and recovery from a "single wheel spin" is performed through the elimination and restoration of field current in the "spinning motor". Although armature current rather than field current may be eliminated, it is preferable to eliminate field current since the armature current levels would be large in comparison to the required field current levels. Moreover, the substantial armature current would require a large relay, increasing the cost of the resulting system. FIG. 2 and FIG. 5 illustrate motor drive systems employing shunt type motors having armature and field coils which are independently excited by a source of voltage to generate armature and field currents.

First Embodiment

FIG. 2 is a block diagram illustrating a first dual motor system in which the present invention may be implemented. As shown, a source of DC voltage 202 (e.g., battery) is provided. In addition, armatures 204 and 206 associated with the two motors are connected in series to the voltage source 202 through an armature controller to provide independent control of the motor armatures 204 and 206. Similarly, motor field windings 208 and 210 are coupled to the armatures 204 and 206 and connected to the source of voltage 202 through a field winding controller to provide control of the motor field windings 208 and 210 independent of the armatures 204 and 206. Although the armature controller and the field winding controller may be implemented separately, they are preferably implemented in a single controller 212 having a single high power amplifier for the armatures 204 and 206.

Figure 3:
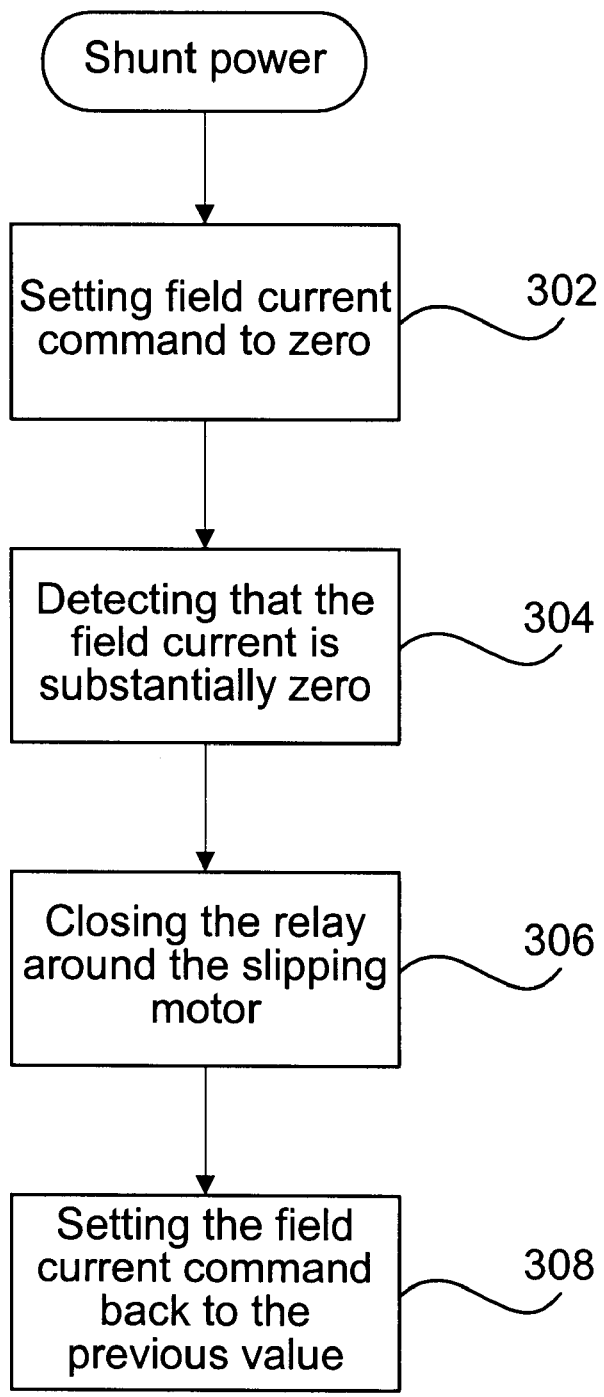
FIG. 3 is a process flow diagram illustrating one method of shunting power to the slipping motor as shown at block 104 of FIG. 1 within the dual motor system illustrated in FIG. 2.
Figure 4:
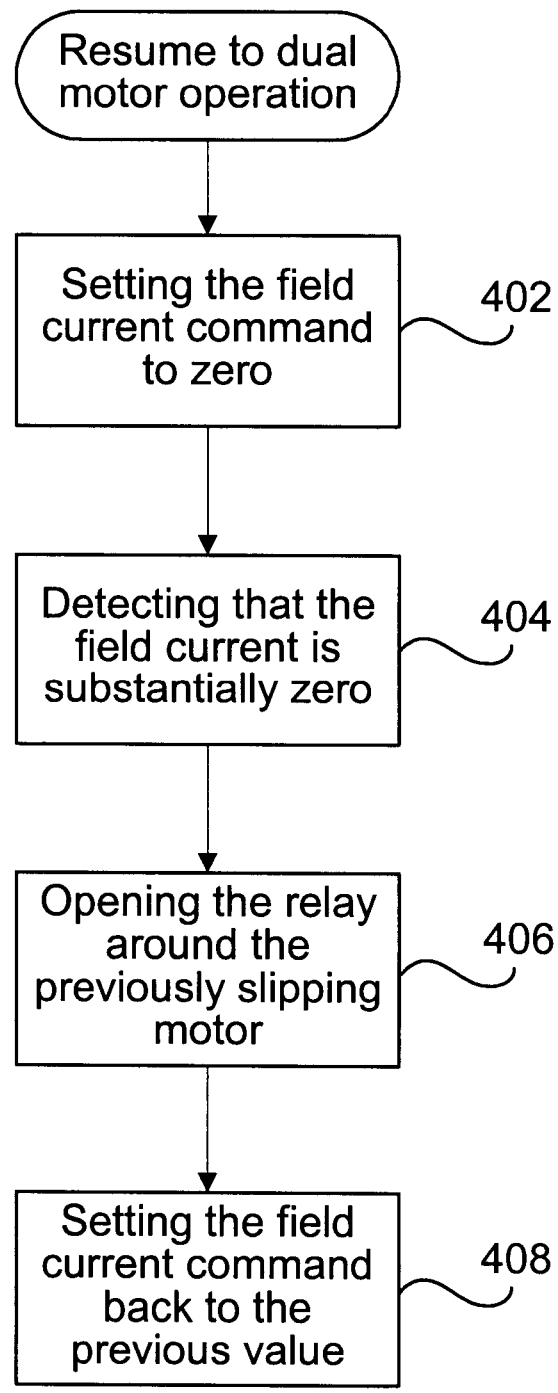
FIG. 4 is a process flow diagram illustrating one method of resuming to dual motor operation as shown at block 110 of FIG. 1 within the dual motor system illustrated in FIG. 2.

It is important to note that in the first dual motor system illustrated in FIG. 2, the field windings 208 and 210 are connected in series and each of the field windings 208 and 210 has an associated relay, 212 and 214, respectively. As described above with reference to block 104 of FIG. 1, the current in the slipping motor is shunted. More particularly, in this embodiment, the field current is eliminated through the use of a relay. FIG. 3 and FIG. 4 together illustrate a method of shunting and restoring power, respectively, while preventing arching of the relay contacts.

FIG. 3 is a process flow diagram illustrating one method of shunting power to the slipping motor as shown at block 104 of FIG. 1 within the dual motor system illustrated in FIG. 2. In this embodiment, the field current is eliminated in the identified motor. Since the field windings 208 and 210 are connected in series, the current flowing through field windings 208 and 210 is identical when the relays 212 and 214 are open, as shown in FIG. 2. In order to eliminate the field current in the slipping motor, the relay around the field windings of the slipping motor must be closed. Thus, the value of the field current flowing through the field coils of the motors is set to zero at block 302. This may be accomplished by setting a field current command to zero, where the field current command indicates a desired field current flowing through the field coils of the motors. Once it is detected that the field current is substantially zero as shown at block 304, the relay around the field coils of the slipping motor is closed at block 306. The field current command is then set back to its previous value at block 308. Since the relay of the slipping motor is closed, the current will now flow through the path of least resistance, and the field current of the slipping motor will therefore be substantially zero. Since the relay of the non-slipping motor remains open, the field current flows through the field windings of the non-slipping motor.

Once the event that caused the motor to slip is over, the shunted motor may be re-engaged. In other words, the current in the shunted motor is re-established in response to a recovery event. Thus, in the embodiment illustrated in FIG. 2, the field current flowing through the shunted motor is restored.

FIG. 4 is a process flow diagram illustrating one method of resuming to dual motor operation as shown at block 110 of FIG. 1 within the dual motor system illustrated in FIG. 2. The field current command is set to zero at block 402 to set a desired field current flowing through the field coils of the motors to zero. Next, at block 404 the present invention detects that the field current is substantially zero. When the field current is substantially zero, the relay around the previously slipping motor is opened at block 406. The field current command is then set back to the previous value at block 408. Since the relay is now open, the current flows through the field windings of the previously slipping motor.

Second Embodiment

Figure 6:
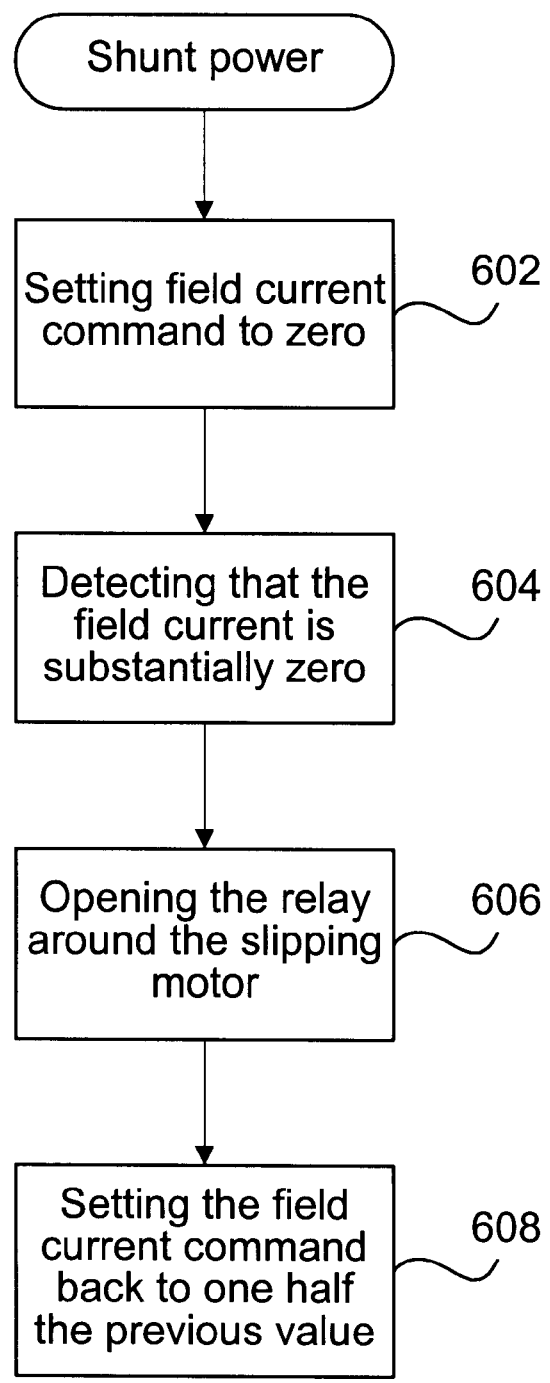
FIG. 6 is a process flow diagram illustrating one method of shunting power to the slipping motor as shown at block 104 of FIG. 1 within the dual motor system illustrated in FIG. 5.
Figure 7:
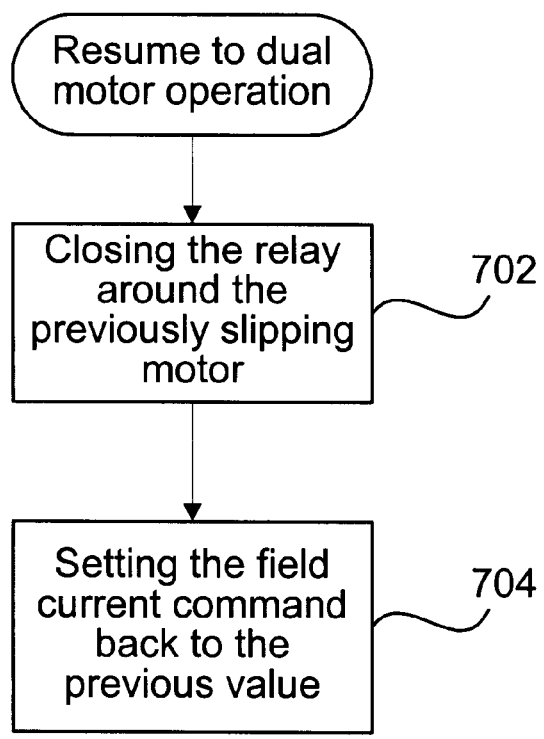
FIG. 7 is a process flow diagram illustrating one method of resuming to dual motor operation as shown at block 110 of FIG. 1 within the dual motor system illustrated in FIG. 5.

FIG. 5 is a block diagram illustrating a second dual motor system in which the present invention may be implemented. In this embodiment, field windings 502 and 504 are connected in parallel rather than in series. Moreover, the field windings 502 and 504 of both motors have an associated relay 506 and 508, respectively. As shown, during normal operation of the vehicle, the relays 506 and 508 remain closed. In order to eliminate field current flowing through the slipping motor, the appropriate relay 506 or 508 is opened. FIG. 6 and FIG. 7 together illustrate a method of shunting and restoring power, respectively, while preventing arching of the relay contacts.

FIG. 6 is a process flow diagram illustrating one method of shunting power to the slipping motor as shown at block 104 of FIG. 1 within the dual motor system illustrated in FIG. 5. Since the current will be set to zero and then restored, it may be desirable to ascertain a value of the field current flowing through the field coils of the motors. In order to eliminate the field current in the slipping motor, the field current flowing through the field coils of the motors is reduced to substantially zero. As shown at block 602, this may be accomplished by setting a field current command to zero, where the field current command indicates a desired field current flowing through the field coils of the motors. Once it is detected that the field current is substantially zero at block 604, the relay around the slipping motor is opened at block 606. During normal operation of the vehicle, the current flowing through the field windings of the motors is divided among the field windings 502 and 504. Thus, when field current no longer flows through one of the motors, the current (e.g., via the field current command) is reduced by this amount in order to maintain previous current levels in the non-slipping motor(s). Since in this example there are two motors, the field current command is set back to one half the previous field current value at block 608. Of course, if more than two motors are used, the field current will be reduced by (1/the number of motors) prior to setting the field current at block 608. In other words, the current will be (1-1/the number of motors)*previous field current value. For example, where there are three motors, the amount of current will be reduced by one-third of the previous field current value.

FIG. 7 is a process flow diagram illustrating one method of resuming to dual motor operation as shown at block 110 of FIG. 1 within the dual motor system illustrated in FIG. 5. In order to cause field current to flow through the previously slipping motor, the relay is closed to allow field current in the previously slipping motor at block 702. The field current command is then set back to the previous value of the field current at 704. In other words, the field current is increased to its previous value to accommodate the previously slipping motor. It is important to note that recovery in the second embodiment does not require shutting down the field a second time. This is preferable since each shutdown causes a torque loss and noticeable bump.

Third Embodiment

FIG. 8 is a block diagram illustrating a third dual motor system in which the present invention may be implemented. In this embodiment, field windings 802 and 804 of the motors are connected in parallel and each of the motors has a separate associated field amplifier (not shown). In this embodiment, the controller 212 includes an independent field amplifier for each of the field windings 802 and 804. Thus, each of the field windings 802 and 804 has independent control and therefore no field shunting relays are required.

In order to eliminate field current in the slipping motor, a field current command associated with the slipping motor is set to substantially zero. Similarly, once recovery of power to both motors is desired, the field current command is set to its previous value. Unlike the previous two embodiments, there is no complete loss of torque during activation or de-activation of the anti-spin system and no mechanical parts to fail or delay activation/de-activation.

Detection of Slipping Motor

There are various ways to detect a "slipping motor" condition. One slip detection mechanism is based on the relative voltage drop across the different motors. More specifically, during normal operation, the applied voltage across each of the motors should be approximately identical. For instance, in a dual motor system, the voltage across a single motor should be approximately one half the total applied voltage (assuming they are identical motors). However, when one of the motors slips, the voltage across this motor will be greater than a particular threshold voltage. Of course, there may be other reasons for having different voltage drops across the motors as well. Most notably, in the event of a non-slipping turn, the wheels will be rotating at different speeds, and thus, the voltage drops across motors will be different as a function of the tightest permissible turning radius. For instance, the relative turning radius of an outside wheel with respect to an inside wheel may be determined as follows: $V_{out}/V_{in} = (L+W)/L$ where L is the length of the vehicle and W is the width of the vehicle. When the turning radius of one wheel is within 25 percent of the turning radius of another wheel, a wheel is determined to be slipping when V>½ Vtot+0.25Vtot where Vtot is the total motor voltage across all of the motors and 0.25Vtot functions as a voltage range that defines a slipping motor condition. Thus, a threshold voltage may be set over which it is assumed that varies with the relative turning radius of the wheels associated with the motors. This voltage range may be programmable and may reflect the relative turning radius of the two wheels, as described above. Thus, in a dual motor system in which the maximum relative turning radius between the wheels is 25 percent, the voltage V across a single motor should be approximately ½ Vtot, but may rise to ½Vtot+0.25Vtot. When the voltage V exceeds this threshold amount, the wheel is determined to be slipping. This method is ideal in instances where the wheels have a long turning radius and therefore the motors run at approximately the same speed during turns of the wheels.

Alternatively, rather than using a fixed threshold value, one or more angle sensors may be used to ascertain a relative angle of rotation of the two wheels to ascertain the appropriate voltage range and therefore the threshold voltage.

In order to ascertain the voltage across a single motor, the voltage may be monitored between the motor armatures with respect to ground. The filtered Controller output voltage is subtracted from the measured battery voltage with the result equal to the total voltage applied across the two motors. The voltage between the armatures is measured with respect to battery ground and the filtered Controller output voltage is subtracted, with the result being the voltage across a single motor. In a half-bridge power topology, the pulse width modulation (PWM) applied can be used to determine motor voltage.

An alternative approach to detecting a slipping motor includes the detection of a specific rate of acceleration or increased acceleration rate. Thus, when the acceleration of one of the motors exceeds a maximum acceleration rate, this may indicate a slipping motor condition. This method may be used for wheels of any turning radius. The acceleration rate, or difference in acceleration rates, may be estimated through the calculation of the derivative of the differences between the velocities of the motors with respect to time. Moreover, the first derivative of the differences between the applied motor voltages represents the rate of velocity difference between the motors. Alternatively, the velocities may be sampled over time to determine the change in velocity over time. For instance, the velocity of the motors may be sampled every 10 milliseconds. The velocity of the motors may be obtained, for example, through the use of speed sensors in each wheel. When one motor slips, the acceleration rate changes dramatically and creates a definitive signal that represents wheel slip.

In accordance with another approach to detecting a slipping motor, the speed of the motor may be used to determine whether motor slip is occurring. The speed may provide direct feedback to motor slip. As described above, the speed of the motors may be obtained through the use of speed sensors coupled to the wheels of the vehicle or through sampling motor voltage or applied currents. When motor armature resistance is known, motor speed can be estimated through a calculated motor model.

Another approach to detection of a slipping motor includes ascertaining the speed of the motors. More particularly, the speed of two or more motors may be compared to determine if wheel slip is occurring, since the speed of a slipping motor will be much faster than that of the other non-slipping motor. For example, a motor model may be used to determine motor speed. Armature current, applied voltage and field current in each motor may be measured or calculated from measurements and input into this motor model to ascertain various motor speeds. Accordingly, any of the above mechanisms may be used to detect a wheel slip as well as identify the motor responsible for the wheel slip.

Recovery Event Used to Initiate Restoration of Power to Previously Slipping Motor Various recovery events may be used to determine the appropriate conditions for re-engaging the shunted motor. The present invention preferably detects that the vehicle has moved in the desired direction. For instance, the movement of the vehicle for a specified period of time or distance could be ascertained. This would indicate a regain of traction and after some distance, it could be assumed that traction could be restored to both wheels. Other methods for detecting such movement include, but are not limited to, detecting a reduction in armature current in one of the motors. Similarly, voltage and current data may be input into a motor model to detect a speed of the previously slipping motor to establish whether the speed of the motor is increasing. Moreover, speed sensors may be used to determine the speeds of various motors. When the speeds of the previously slipping motor and another motor are determined to be within a specified range (and therefore approximately the same), the movement of the vehicle is detected. As another example, a user-initiated event such as a return of the throttle in the vehicle to neutral or initiation of braking could also be used as recovery events to initiate the recovery of the vehicle into normal dual motor operation. Of course, a mere lapse of a predetermined period of time may be useful, although not preferable, in determining the movement of the vehicle.

Figure 9:
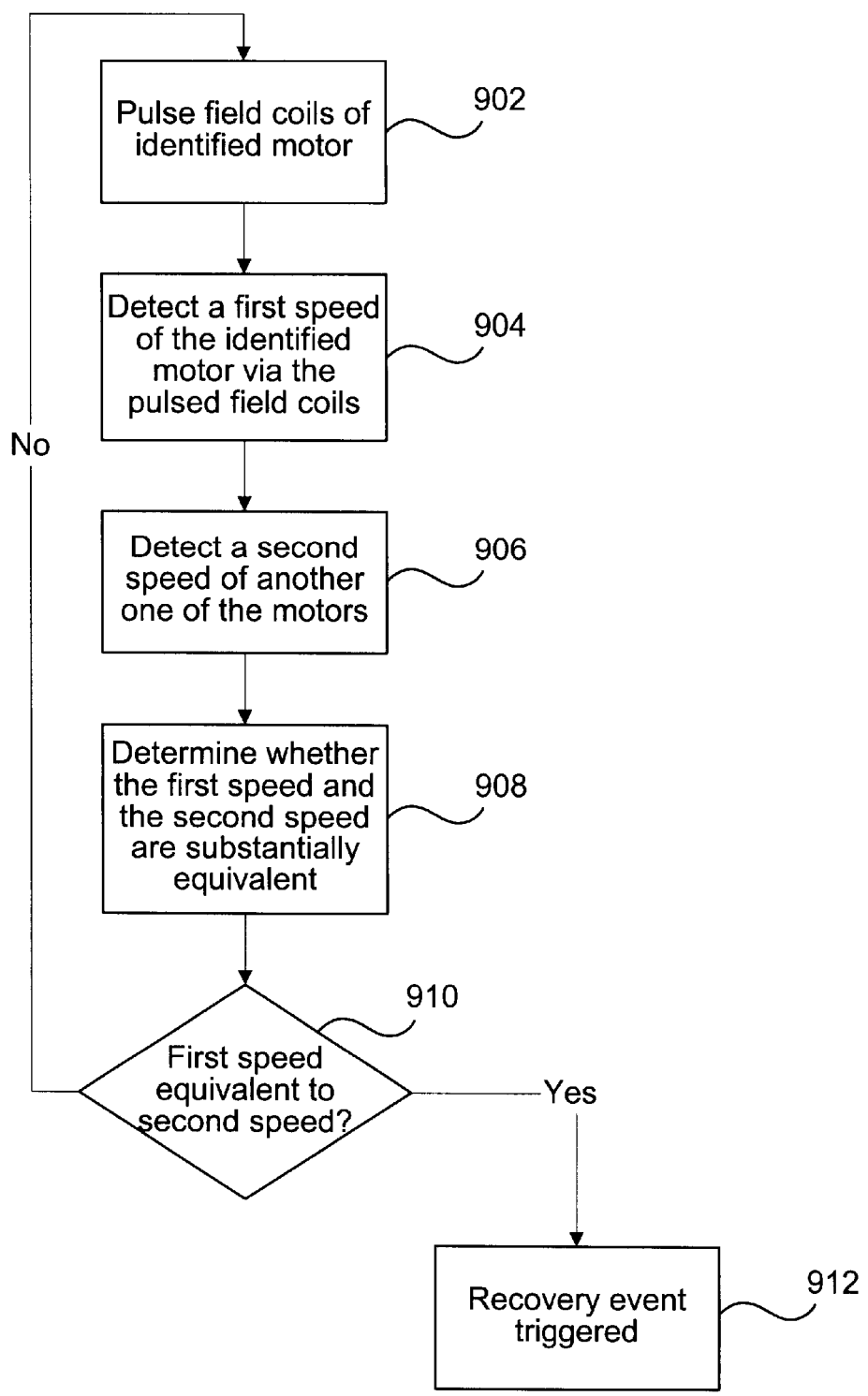
FIG. 9 is a process flow diagram illustrating one method of detecting a recovery event indicating that the shunted motor of the third embodiment illustrated in FIG. 8 may be re-engaged.

FIG. 9 illustrates one method of detecting a recovery event indicating that the shunted motor of the third embodiment illustrated in FIG. 8 may be re-engaged. More particularly, in a system having two or more field amplifiers, the offending motor's field could be pulsed on periodically to allow detection of its back EMF and thus its motor speed. If the detected motor speed is substantially the same as the motor with traction, then both motors would be re-engaged. Thus, at block 902, the field coils of the previously slipping motor are pulsed. The speed of the motor is then detected via the pulsed field coils. The speed of another one of the motors is detected at block 906. It is next determined whether the speeds of the two motors are substantially equivalent at block 908. If the speeds of the two motors are determined to be substantially equivalent at block 910, a recovery event is triggered at block 912. Otherwise, the field coils of the offending motor could continue to be pulsed on periodically until a recovery event is established.

The present invention provides automatic detection as well as automatic anti-spin engagement. However, the present invention may also inform an operator of the spinning wheel condition by providing an indicator (e.g., light, beeper, display) of the detected condition. The operator may then initiate the anti-spin control manually.

The controller of the present invention may generally be implemented on any suitable computer system (e.g., microprocessor). In addition, the present invention may be implemented as computer-readable instructions stored on any suitable computer-readable media.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described a dual motor system, more than two motors may be used. Moreover, although shunt relays are shown to be connected to the field windings in some of the above-described embodiments, it is also possible to shunt the armature current. Accordingly, the present embodiments are to be considered as illustrative and not restrictive, and the invention is not to be limited to the details given herein, but may be modified within the scope and equivalents of the appended claims.

What is claimed is:

1. In a system having two or more electric motors, the motors adapted for being coupled to two or more wheels of an electric vehicle, each of the electric motors having armature and field coils which are independently excited by a source of voltage to generate armature and field currents, the armatures being connected in series to the voltage source, a method of controlling performance of the electric motors, comprising:

detecting a condition in the system indicating that one of the wheels is slipping;

reducing power delivered to one of the motors that is associated with the slipping wheel in response to the detection of the condition;

providing power to the one or more motors that are not associated with the slipping wheel after the power delivered to the motor associated with the slipping wheel is reduced; and restoring the power delivered to the one of the motors associated with the slipping wheel in response to a recovery event, wherein the recovery event is ascertained from at least one of a detection of movement of the vehicle for a specified period of time, detection of movement of the vehicle for a specified distance, and detection of movement of the vehicle in a desired direction.

2. In a system having two or more electric motors, the electric motors adapted for being coupled to two or more wheels of an electric vehicle, each of the electric motors having armature and field coils which are independently excited by a source of voltage to generate armature and field currents, the armatures being connected in series to the voltage source, a method of controlling performance of the electric motors, comprising:

detecting a condition in the system to ascertain when to deactivate one of the electric motors;

identifying one of the electric motors to deactivate when the condition is detected;

eliminating current in the identified one of the electric motors, the current being armature current or field current;

providing armature current and field current to the one or more electric motors that are not identified as one of the electric motors to deactivate after the current is eliminated in the identified one of the electric motors; and automatically restoring the current in the identified one of the electric motors in response to a recovery event.

3. The method as recited in claim 2, wherein the current is field current.

4. The method as recited in claim 2, wherein the current is armature current.

5. The method as recited in claim 2, wherein eliminating current in the identified motor comprises:

shunting the current around the identified motor with a relay.

6. The method as recited in claim 5, wherein the relay is around the field coils of the identified motor.

7. The method as recited in claim 2, wherein the field coils of the motors are connected in series.

8. The method as recited in claim 7, wherein the current is field current and eliminating current in the identified motor comprises:

ascertaining a value of the field current flowing through the field coils of the motors;

setting a field current command to zero, the field current command indicating a desired field current flowing through the field coils of the motors;

detecting that the field current is substantially zero;

closing a relay around the field coils of the identified motor; and setting the field current command back to the value of the field current that was previously ascertained.

9. The method as recited in claim 8, wherein restoring the current in the identified motor in response to a recovery event comprises:

setting the field current command to zero, the field current command indicating a desired field current flowing through the field coils of the motors;

detecting that the field current is substantially zero;

opening the relay around the field coils of the identified motor; and setting the field current command back to the value of the field current that was previously ascertained.

10. The method as recited in claim 7, wherein the current is field current and eliminating current in the identified motor comprises:

ascertaining a value of the field current flowing through the field coils of the motors;

reducing the field current flowing through the field coils of the motors to substantially zero;

closing a relay around the field coils of the identified motor; and setting the field current flowing through the field coils of the unidentified motors to the value of the field current that was previously ascertained.

11. The method as recited in claim 10, wherein restoring the current in the identified motor in response to a recovery event comprises:

reducing the field current flowing through the field coils of the motors to substantially zero;

opening the relay around the field coils of the identified motor; and setting the field current flowing through the field coils of the unidentified motors to the value of the field current that was previously ascertained.

12. The method as recited in claim 2, wherein the field coils of the motors are connected in parallel.

13. The method as recited in claim 12, wherein the current is field current and eliminating current in the identified motor comprises:

ascertaining a value of the field current flowing through the field coils of the motors;

setting a field current command to zero, the field current command indicating a desired field current flowing through the field coils of the motors;

detecting that the field current is substantially zero;

opening a relay around the field coils of the identified motor; and setting the field current command to one half the value of the field current that was previously ascertained.

14. The method as recited in claim 13, wherein restoring the current in the identified motor in response to a recovery event comprises:

closing the relay around the field coils of the identified motor; and setting the field current command back to the value of the field current that was previously ascertained.

15. The method as recited in claim 12, wherein the current is field current and eliminating current in the identified motor comprises:

ascertaining a value of the field current flowing through the field coils of the motors;

ascertaining a number of the electric motors in the system;

reducing the field current flowing through the field coils of the motors to substantially zero;

opening a relay around the field coils of the identified motor; and setting the field current flowing through the field coils of the unidentified motors to (1-1/the number of the electric motors in the system) the value of the field current that was previously ascertained.

16. The method as recited in claim 15, wherein restoring the current in the identified motor in response to a recovery event comprises:

closing the relay around the field coils of the identified motor; and setting the field current flowing through the field coils of the unidentified motors to the value of the field current that was previously ascertained.

17. The method as recited in claim 2, wherein the field coils of the motors are connected in parallel and each of the motors has a separate associated field amplifier.

18. The method as recited in claim 17, wherein the current is field current, the method further comprising:

pulsing the field coils of the identified motor;

detecting a first speed of the identified motor via the pulsed field coils;

detecting a second speed of another one of the motors; and determining whether the first speed and the second speed are substantially equivalent;

wherein the recovery event is triggered when it is determined that the first speed and the second speed are substantially equivalent.

19. The method as recited in claim 18, wherein detecting the speed of the identified motor comprises detecting a back EMF of the identified motor.

20. The method as recited in claim 17, wherein eliminating current in the identified motor comprises:

reducing the field current in the identified motor to substantially zero.

21. The method as recited in claim 20, further comprising:

ascertaining a value of the field current flowing through the field coils of the identified motor prior to reducing the field current in the identified motor to substantially zero;

wherein restoring the current in the identified motor in response to a recovery event comprises restoring the field current in the identified motor to the value of the field current that was previously ascertained.

22. The method as recited in claim 2, wherein detecting a condition in the system to ascertain when to deactivate one of the motors comprises:

ascertaining a first voltage across the motors;

sensing a second voltage across the one of the motors;

dividing the first voltage across the motors by a number of the motors in the system to ascertain an ideal second voltage;

obtaining a voltage range within which the second voltage is to be from the ideal second voltage when the condition in the system is not detected; and determining whether the sensed second voltage is within the obtained voltage range from the ideal second voltage, wherein the condition is detected when the sensed second voltage is determined not to be within the obtained voltage range from the ideal second voltage.

23. The method as recited in claim 22, wherein sensing a second voltage across the one of the motors comprises:

monitoring a voltage between two of the armatures with respect to ground.

24. The method as recited in claim 22, wherein the motors are adapted for being coupled to one or more wheels of a vehicle and wherein obtaining a voltage range within which the second voltage is to be from the ideal second voltage when the condition in the system is not detected comprises:

ascertaining a relative turning radius of two of the wheels of the vehicle; and applying the ascertained relative turning radius of two of the wheels of the vehicle to the first voltage to ascertain the voltage range, wherein the voltage range is proportional to the relative turning radius of the wheels.

25. The method as recited in claim 22, wherein the motors are adapted for being coupled to one or more wheels of a vehicle and wherein obtaining a voltage range within which the second voltage is to be from the ideal second voltage when the condition in the system is not detected comprises:

ascertaining a relative angle of rotation of two of the wheels of the vehicle using one or more angle sensors; and applying the relative angle of rotation of the two wheels of the vehicle to the first voltage to ascertain the voltage range, wherein the voltage range is proportional to the relative angle of rotation of the wheels.

26. The method as recited in claim 2, wherein detecting a condition in the system to ascertain when to deactivate one of the motors comprises:

determining whether an acceleration rate of the one of the motors exceeds a maximum allowed acceleration rate.

27. The method as recited in claim 2, wherein the motors are adapted for being coupled to one or more wheels of a vehicle and wherein detecting a condition in the system to ascertain when to deactivate one of the motors comprises:

ascertaining a first speed of the one of the motors.

28. The method as recited in claim 27, wherein ascertaining the first speed of the one of the motors comprises:

sensing the first speed of the motor via a speed sensor coupled to the associated one of the wheels.

29. The method as recited in claim 27, further comprising:

ascertaining a second speed of another one or more of the motors; and comparing the first speed of the one of the motors with the second speed.

30. The method as recited in claim 29, wherein ascertaining the first speed and the second speeds comprises:

inputting armature current, applied voltage, and field current associated with each motor into a motor model; and applying the motor model to determine the first speed and the second speed.

31. The method as recited in claim 2, wherein the recovery event is a detection of movement of the vehicle in a desired direction after identifying one of the motors to deactivate, eliminating current in the identified motor, and providing armature current and field current to the one or more motors that are not identified as one of the motors to deactivate.

32. The method as recited in claim 2, wherein the recovery event is a detection of movement of the vehicle for a specified period of time after identifying one of the motors to deactivate, eliminating current in the identified motor, and providing armature current and field current to the one or more motors that are not identified as one of the motors to deactivate.

33. The method as recited in claim 2, wherein the recovery event is a detection of movement of the vehicle for a specified distance after identifying one of the motors to deactivate, eliminating current in the identified motor, and providing armature current and field current to the one or more motors that are not identified as one of the motors to deactivate.

34. The method as recited in claim 31, wherein the current is field current, the method further comprising:
   detecting a reduction in armature current in one of the motors to detect the movement of the vehicle.

35. The method as recited in claim 31, further comprising:
   inputting voltage data and current data into a motor model; and
   applying the motor model to detect a speed of the identified motor.

36. The method as recited in claim 31, further comprising:
   detecting a difference between the speed of the identified motor and another one of the motors via one or more speed sensors; and
   determining whether the difference is within a specified amount;
   wherein the movement of the vehicle is detected when the difference is determined to be within the specified amount.

37. The method as recited in claim 2, wherein the recovery event is a lapse of a predetermined period of time after identifying one of the motors to deactivate, eliminating current in the identified motor, and providing armature current and field current to the one or more motors that are not identified as one of the motors to deactivate.

38. The method as recited in claim 2, wherein the recovery event is a non-automatic user-initiated event that is performed by a user of the vehicle.

39. The method as recited in claim 38, wherein the user-initiated event is a return of a throttle in the vehicle to neutral.

40. The method as recited in claim 38, wherein the user-initiated event is an initiation of braking of the vehicle.

41. The method as recited in claim 2, further comprising:
   providing an indicator of the detected condition, the indicator being a visual or auditory indicator; and
   performing the eliminating, providing, and re-establishing steps in response to a user-initiated event.

42. Apparatus for controlling performance of two or more DC motors used for driving an electric vehicle, each of the electric motors having armature and field coils which are independently excited by a source of voltage to generate armature and field currents, comprising:
   a source of DC voltage;
   two or more motor armatures connected in series to the voltage source through an armature control circuit to provide independent control of the motor armatures;
   two or more motor field windings coupled to the two or more motor armatures and connected to the source of voltage through a field winding control circuit to provide control of the two or more motor field windings independent of the armatures;
   a detection mechanism for detecting a condition in one of the motors, the condition when in a first state indicating that one of the motors is to be deactivated and when in a second state indicating that none of the motors are to be deactivated;
   an identification mechanism coupled to the detection mechanism, the identification mechanism adapted for identifying one of the motors to deactivate when the condition is in the first state;
   a motor controller coupled to the armatures and the field windings, the motor controller being adapted for eliminating current in the identified motor when the condition is in the first state and for restoring current in the identified motor in response to a recovery event, the current being armature current or field current;
   a drive mechanism for providing armature current and field current to the motors that are not identified by the sensing mechanism as one of the motors to deactivate after the motor controller has eliminated the current in the identified motor; and
   a recovery mechanism coupled to the motor controller, the recovery mechanism being adapted for restoring current in the identified motor in response to a recovery event that is a user-initiated event performed by a user of the vehicle.

43. The apparatus as recited in claim 42, wherein the current is armature current.

44. The apparatus as recited in claim 42, wherein the current is field current.

45. The apparatus as recited in claim 42, wherein the motor controller includes a shunting mechanism and a recovery mechanism, the shunting mechanism being adapted for eliminating field current in the identified motor and the recovery mechanism being adapted for restoring the field current in the identified motor in response to a recovery event.

46. The apparatus as recited in claim 45, wherein the field windings are connected in series, each of the field windings having an associated relay, wherein the shunting mechanism is adapted for closing the relay around the field windings of the identified motor, and wherein the recovery mechanism is adapted for opening the relay around the field windings of the identified motor in response to the recovery event.

47. The apparatus as recited in claim 45, wherein the field windings are connected in parallel, each of the field windings having an associated relay, wherein the shunting mechanism is adapted for opening the relay around the field windings of the identified motor, and wherein the recovery mechanism is adapted for closing the relay around the field windings of the identified motor in response to the recovery event.

48. The apparatus as recited in claim 45, wherein the field windings are connected in parallel, each of the field windings having an associated field amplifier, wherein the shunting mechanism is adapted for reducing the field current in the identified motor to substantially zero, and wherein the recovery mechanism is adapted for restoring the field current in the identified motor to its previous value in response to the recovery event.

49. Apparatus for controlling performance of two or more DC motors used for driving an electric vehicle, each of the electric motors having armature and field coils which are independently excited by a source of voltage to generate armature and field currents, comprising:

a source of DC voltage;

two or more motor armatures connected in series to the voltage source through an armature controller to provide independent control of the motor armatures;

two or more motor field windings coupled to the two or more motor armatures and connected to the source of voltage through a field winding controller to provide control of the two or more motor field windings independent of the armatures;

a detection mechanism for identifying one of the motors to deactivate;

a shunting mechanism coupled to the detection mechanism and to the field windings for eliminating field current in the identified motor;

a drive mechanism for providing armature current and field current to the motors that are not identified by the detection mechanism as one of the motors to deactivate after the shunting mechanism has eliminated field current in the identified motor; and a recovery mechanism adapted for restoring field current in the identified motor in response to a recovery event, wherein the recovery event is ascertained from at least one of a detection of movement of the vehicle for a specified period of time, detection of movement of the vehicle for a specified distance, and detection of movement of the vehicle in a desired direction.

* * * * *